United States Patent [19]
Clark et al.

[11] Patent Number: 6,094,195
[45] Date of Patent: Jul. 25, 2000

[54] DYNAMIC PRESENTATION OF FREQUENTLY CHANGING VALUES

[75] Inventors: David John Clark, Woodloes Park; Adam Alexander Dobson, Benfleet; Andrew John Smith, Wellesbourne, all of United Kingdom

[73] Assignee: International Business Machines Corporation, Armonk, N.Y.

[21] Appl. No.: 09/022,099

[22] Filed: Feb. 11, 1998

[30] Foreign Application Priority Data

Jul. 5, 1997 [GB] United Kingdom .................. 9714162
Jul. 18, 1997 [GB] United Kingdom .................. 9715054

[51] Int. Cl.[7] .............................. G06F 13/00; G06F 3/00
[52] U.S. Cl. ........................ 345/349; 345/977; 345/970
[58] Field of Search ................................. 345/333, 334, 345/335, 348, 349, 350, 351, 352, 353, 354, 977, 970; 709/303, 302

[56] References Cited

U.S. PATENT DOCUMENTS 5,768,148  6/1998  Murphy et al. ........................ 345/332
5,874,954  2/1999  Kilmer et al. ........................ 345/333

OTHER PUBLICATIONS

Microsoft Mouse Manager, 1993.

Delphi 3 TGauge Component, Borland, Mar. 1997.

Primary Examiner—Raymond J. Bayerl
Assistant Examiner—David E. Brown
Attorney, Agent, or Firm—Owens J. Gamon

[57] ABSTRACT

A user interface component, gauge, is adapted to present a changing value according to a pre-determined behavioral and presentational characteristic. The component includes a kernel which is adapted to display a presentation value; a control interface through which an external system communicates the changing value to the kernel; a presentation interface through which the presentation characteristic of the user interface component is determined; and a behavior interface through which an external system communicates with said kernel to determine the behavioral characteristic of the user interface component.

6 Claims, 9 Drawing Sheets

FIG. 1

```
public interface GaugeSynchronization
{ public long getNextValue(long gaugeValue,
                           long gaugeMinimum,
                           long gaugeMaximum,
                           long currentDisplayValue,
                           long currentDisplayMinimum,
                           long currentDisplayMaximum);

public boolean isSynchronized(long gaugeValue,
                                long gaugeMinimum,
                                long gaugeMaximum,
                                long currentDisplayValue,
                                long currentDisplayMinimum,
                                long currentDisplayMaximum);

public long getNextValueDelay(boolean isSynchronized);

public void resetSynchronization(); }
```

FIG. 2A

```
public long getNextValue(.......)
{ return gaugeValue; }
```

FIG. 2B

```
public boolean isSynchronized(.....)
{ return (gaugeValue == currentDisplayValue)
      && (gaugeMinimum == currentDisplayMinimum)
      && (gaugeMaximum == currentDisplayMaximum); }
```

FIG. 2C

```
public long getNextValueDelay(boolean isSynchronized)
{ return (isSynchronized ? 0 : 1); }
```

FIG. 2D

```
public long getNextValue(.....)
{ long result = currentDisplayValue;

if (result != gaugeValue)
  {
    long sgn = (result > gaugeValue) ? -1 : +1;    // direction of jump
    long abs = Math.abs(result - gaugeValue);
    result += sgn * Math.min(abs, STEP_AMOUNT);    // maximum jump
  } return result; }
```

FIG. 3

```
do
  if POSITION is unset do
    POSITION = (previousDisplayValue - previousDisplayMinimum)
             / (previousDisplayMaximum - previousDisplayMinimum)
  end if VELOCITY is unset do
    VELOCITY = 0.0
  end TARGET = (gaugeValue - gaugeMinimum)
         / (gaugeMaximum - gaugeMinimum)

do QUANTA times
    if POSITION <> TARGET do
      ACTUALPERIOD = NATURALPERIOD * QUANTA
      ACTUALDAMPING = min(DAMPING, (ACTUALPERIOD-0.1) / (4.0 * PI))
      OMEGA = (2.0 * PI) / ACTUALPERIOD
      DISPLACEMENT = POSITION - TARGET
      ACCELERATION = - (OMEGA * OMEGA * DISPLACEMENT)
```
} A

FIG. 4A-1

```
         // now apply damping to acceleration
         ACCELERATION -= 2.0 * ACTUALDAMPING * OMEGA * (VELOCITY+ACCELERATION)

// now apply acceleration to velocity
         VELOCITY += ACCELERATION
      end
A  ⎨
         // now apply velocity to position
         POSITION += VELOCITY // now "bounce" the position if out-of-range
         if POSITION > 1.0 do
            POSITION = 2.0 - POSITION
            VELOCITY = -VELOCITY
         end
         if POSITION < 0 do
            POSITION = -POSITION
            if POSITION > 1.0 POSITION = 1.0
            else VELOCITY = -VELOCITY
         end
      end
   end
   return gaugeMinimum + (POSITION * (gaugeMaximum - gaugeMinimum))
```

FIG. 4A-2

```
do
  THRESHOLD = 0.1 / ((gaugeMaximum - gaugeMinimum) * QUANTA);

if ( (VELOCITY < THRESHOLD)
   and (VELOCITY > -THRESHOLD)
   and (gaugeValue == currentDisplayValue) )
  do
    POSITION = unset
    VELOCITY = unset
    RESULT = true
  end
  else RESULT = false
end
return RESULT
```

FIG. 4B

…

1.1. A means for the behaviour customisation to specify the next presentation value, given the previous presentation value and the current gauge value.

1.2. A means for the behaviour customisation to indicate to the gauge kernel whether or not the presentation is now synchronised.

1.3. A means for the behaviour customisation to control when the gauge kernel will next consult it.

If a behaviour customisation is to achieve effects other than simply presenting new gauge values immediately, it can do so by carefully computing the next presentation value each time it is consulted. The next presentation value is thus typically influenced by, but is not necessarily equal to, the current gauge value.

Since changes to the gauge value are not necessarily reflected at once to the user, an external control system may wish to be notified when the gauge presentation is synchronised before it continues with some other processing. The gauge kernel can notify the external control system of this via a suitable control interface. It is not sufficient for the gauge kernel to assume that the presentation is synchronised just because the presentation value and gauge value become equal, as the presentation value may be just one of a sequence of intermediate values to be supplied by the behaviour customisation. Therefore, whether or not the gauge presentation can be considered synchronised is indicated by the behaviour customisation.

If an animated effect is to be produced, the behaviour customisation will need to be consulted on a regular basis, perhaps on a repeated time interval. Sometimes, this animation will need to continue even when the gauge display is synchronised, in order to provide ongoing animated effects. An example, is a gauge displaying a car travelling along a road. When synchronised, the car is displayed in the middle of the screen with the road passing underneath. If the car speeds up or slows down, it may move left or right before returning to a synchronised quiescent state with the car in the centre of the screen, but with the animation of the road continuing at a different speed.

Many behaviour customisations, however, will not need to be consulted again until the gauge value next changes, once they are synchronised.

Gauge Kernel

This is the component which presents the behaviour interface described above, and which contains the logic to manage the flow of control and data smoothly. The gauge kernel must function in such a way as to execute the instructions of the customisations attached to it, and of any external control system controlling it via a suitable control interface.

The principal update sequence executed by the kernel is of the following general form:

2.1. Consult the behaviour customisation to determine the next presentation value.

2.2. Submit the next presentation value for presentation to the user.

2.3. Consult the behaviour customisation to determine whether the presentation value is now synchronised.

2.4. If the presentation value is now synchronised, issue any required notifications of this, via the control interface.

2.5. Consult the behaviour customisation to determine, according to whether or not the gauge is synchronised, a time delay after which the kernel is to consult the behaviour customisation. If the next change in the gauge value occurs sooner, then the behaviour customisation is consulted at that time.

2.6. Wait until that specified time delay elapses or the time arrives, and commence update sequence again.

In this sequence, the behaviour customisation is consulted three times each time through the sequence (steps 2.1, 2.3, 2.5). These consultations correspond to features 1.1, 1.2 and 1.3 of the behaviour interface described above. Although the consultations are shown here as separate, they may in practice be combined as is convenient for the implementation.

If the gauge value is updated via a suitable control interface, the following steps will be required:

3.1. Update the stored gauge value.

3.2. If the update sequence shown above is currently in step 2.6, and is waiting for the gauge value to change, trigger the required re-commencement of the update sequence.

3.3. Issue any required notifications of the gauge value changing, via the control interface.

It will be seen that the above division of the principle update sequence 2.1 . . . 2.6 and the update of the gauge value 3.1 . . . 3.3 allows these sequences to be managed independently and asynchronously, thus allowing the independent behaviour customisation of the gauge to be provided.

Behaviour Customisation

This contains the logic which controls interaction with a gauge via the behaviour interface described above, and manages the internal behaviour which this customisation defines. The possibilities for behaviours are of course unlimited, and in many cases the details will be prescribed by the particular presentation required. However, the following list describes some of the more common behaviour models:

4.1. "immediate"—the next presentation value always matches the current gauge value, the presentation is always synchronised, and the next consultation is whenever the gauge value next changes.

4.2. "lagged immediate"—as "immediate", except that the next consultation is subject to a minimum time delay, thus ensuring that gauge value presentations remain on display for at least the given time delay.

4.3. "linear"—the next presentation value differs from the previous presentation value by a fixed absolute amount, and in the direction which brings it toward to the current gauge value, unless that would take it past the current gauge value in which case the next presentation value is the current gauge value itself. The presentation is synchronised whenever the current gauge value is attained in this way. If the presentation is synchronised then the next consultation is whenever the gauge value next changes, otherwise it is subject to a time delay (which may be zero).

4.4. "inertial"—the next presentation value is computed so as that it first accelerates toward the current gauge value, and then slows gradually as that value is approached. This can be done so that the sequence of presentation values just ends as the gauge value is reached, or the sequence can alternatively be allowed to "overshoot", and then swing back toward the current gauge value, possibly executing several more overshoots before finally settling at that value. The presentation is synchronised when it settles in this way. If the presentation is synchronised then the next consultation is whenever the gauge value next changes, otherwise it is subject to a time delay (which may be zero).

The present embodiment has been implemented in Java. The invention is equally suitable for other object-oriented programming environments in which user interface components are constructed.

Gauge

A Java interface, named Gauge, defines methods which allow an external system to control the gauge value and receive notifications when the gauge value changes.

BaseGauge

A Java class, named BaseGauge, provides the gauge kernel. The class implements the Gauge interface, and allows the presentation to be customised by means of an abstract method called "paint". This method is passed, inter alia, the presentation value together with the next presentation value and a flag indicating if paint is to re-paint the entire gauge display or incrementally update an existing gauge display. Thus, actual gauge classes extend BaseGauge and implement the abstract paint method appropriately.

The behaviour interface is implemented as a Java interface, called GaugeSynchronization. An instance of a gauge synchronisation class which implements this interface can be associated with an instance of the gauge class which extends BaseGauge by passing the name of the instance of the gauge synchronisation class to a "setGaugeSynchronization" method on BaseGauge.

BaseGauge also supports a default GaugeSynchronization. The default GaugeSynchronization is specified by each gauge which extends BaseGauge, so that each such gauge can choose a suitable default behaviour. The current GaugeSynchronization can be obtained by calling a "getGaugeSynchronization" method: if "setGaugeSynchronization" has been called, the supplied GaugeSynchronization is returned, otherwise the default GaugeSynchronization is returned.

In BaseGauge, the principle update sequence 2.1 . . . 2.6 preferably executes on a separate Java thread, which allows for the synchronous update of the "gauge value". The "gauge value" is actually three 64-bit integers, representing the limits of a range and a value within that range. These three values are treated as a single value throughout: they are always passed around together, and assignments between sets of variables are made atomic by using Java synchronization services.

GaugeSynchronization

The GaugeSynchronization interface has three principal methods implementing the respective features 1.1, 1.2 and 1.3 of the behaviour interface described above.

5.1. "getNextValue", which returns the next presentation value.

5.2. "isSynchronized" returns whether or not the presentation is now synchronised.

5.3. "getNextValueDelay" returns the time interval to wait before next commencing the update sequence. There are also special values which can be returned including a no_wait value, in the present embodiment "1"; and an indefinite wait value, in the present embodiment, "0", to wait until the gauge value next changes.

Figure 1:
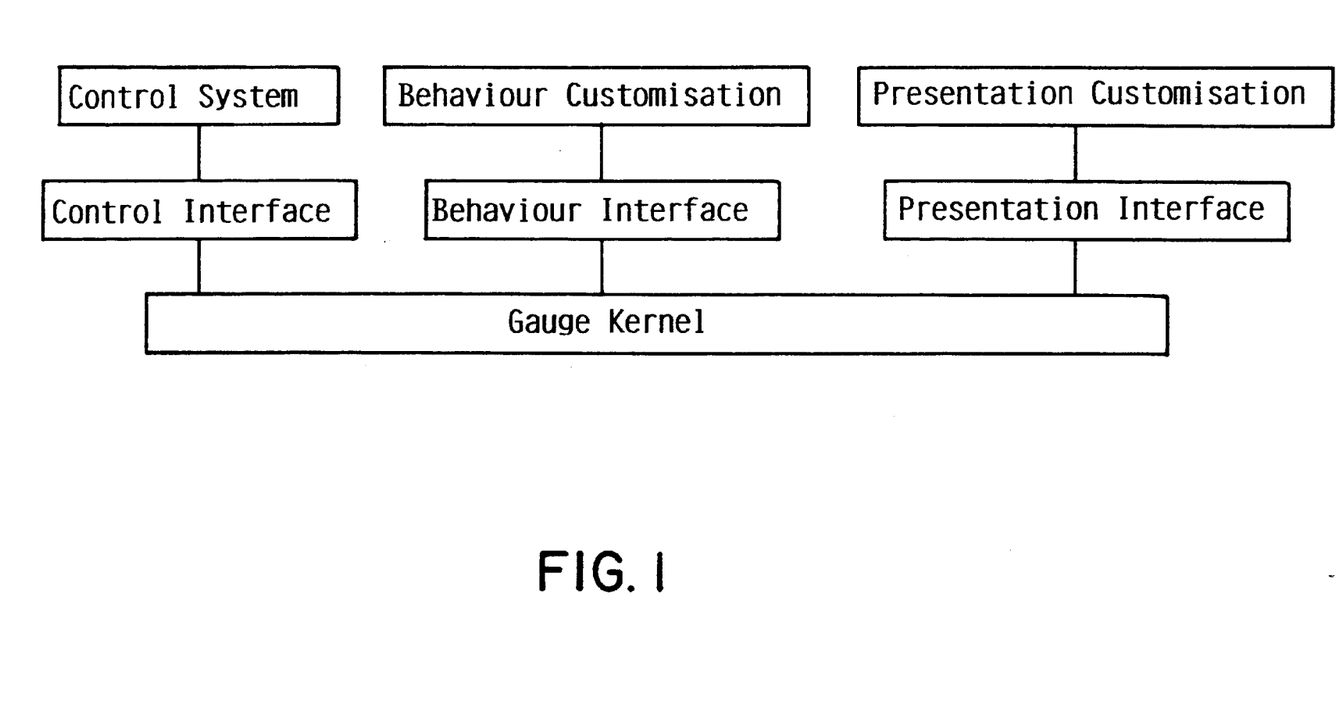
Figure 2A:
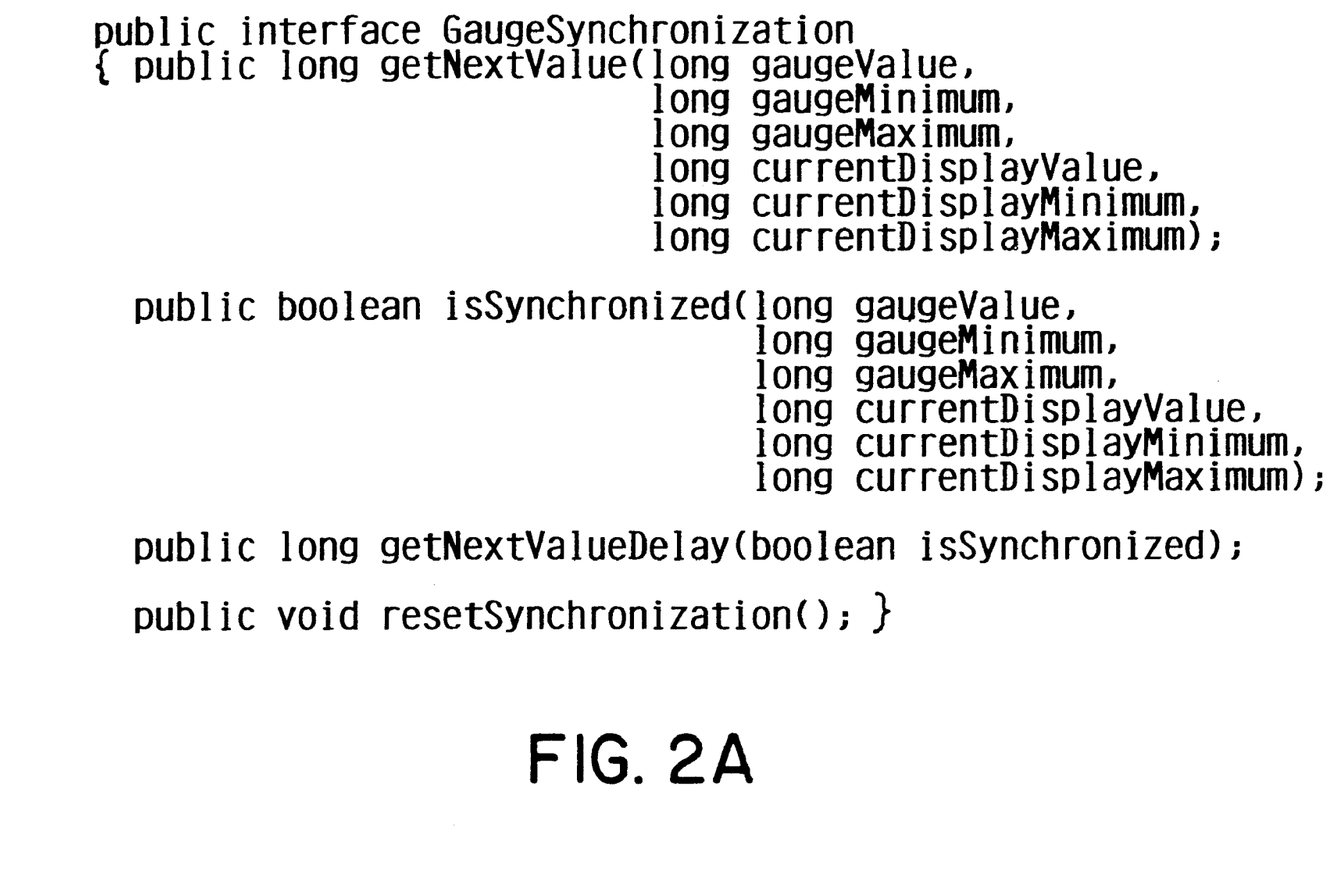

The Java definition of this interface is shown in FIG. 2(a). The additional "resetSynchronization" method shown is called automatically by BaseGauge whenever a GaugeSynchronization is passed into a gauge via the "setGaugeSynchronization" method, and is an opportunity for behaviour customisations which store some internal state information to reset that state information ready to start afresh.

Implementations of GaugeSynchronization

In most cases, it is straightforward for one skilled in the art to create the GaugeSynchronization for a required behaviour. In order to illustrate the process, and clarify the operation of the methods, we now briefly discuss creating implementations of the typical behaviours described above.

Figure 2B:
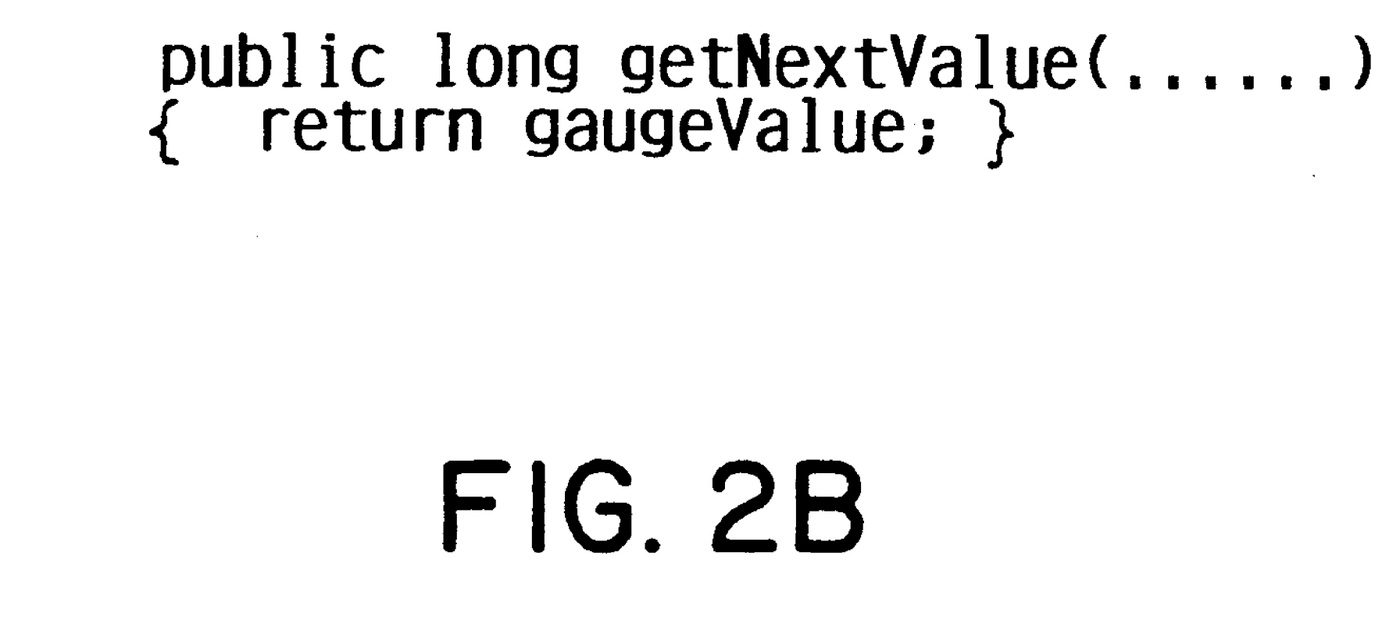

To create an "immediate" behaviour, as described at 4.1, the body of the "getNextValue" method simply needs to return the current gauge value, as shown in FIG. 2(b) (the complete parameter lists have been omitted for brevity, and replaced with six periods).

Figure 2C:
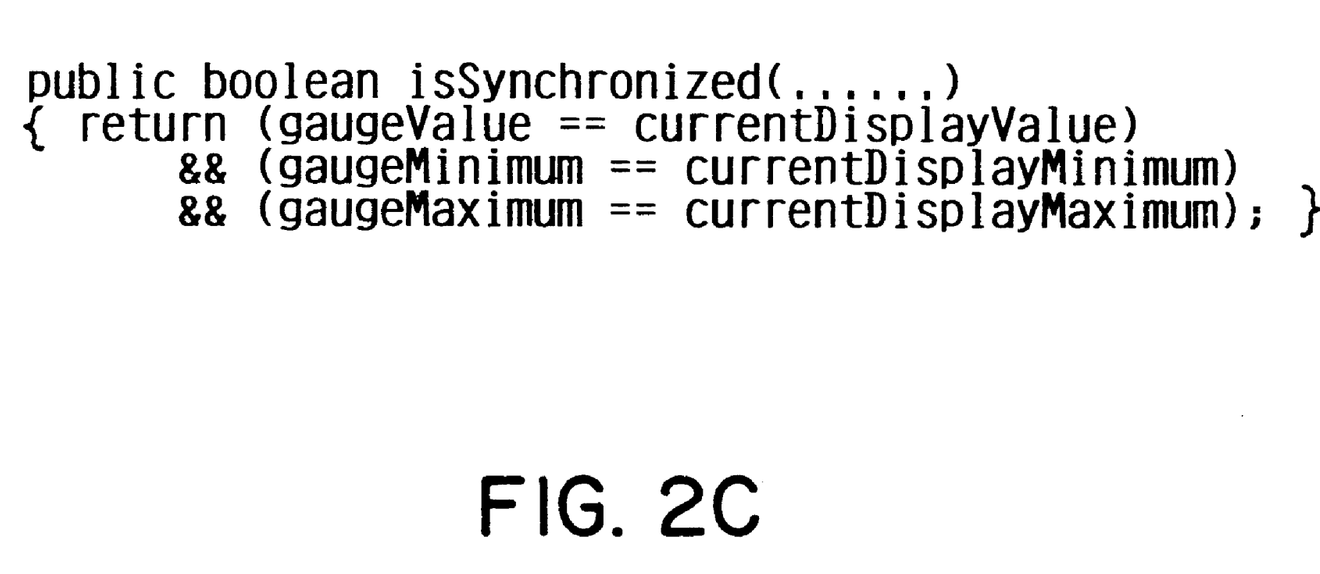

For this behaviour, synchronised simply means that the presentation value now equals the gauge value, as shown in FIG. 2(c).

Figure 2D:
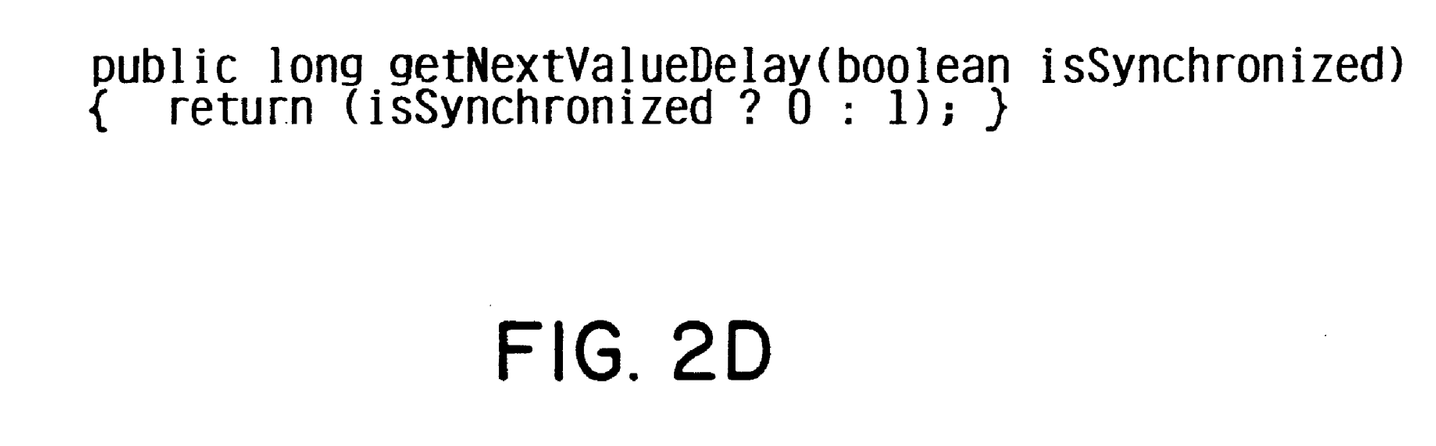

FIG. 2(d) shows an implementation of getNextValueDelay. If we are not already synchronised, the gauge value must have already changed, so no_wait, i.e. "1" is returned. For a "lagged immediate" behaviour as described at 4.2, a greater value would be returned here. Otherwise, the gauge is synchronised and, for this behaviour, an indefinite wait, i.e. "0" is returned, causing the kernel to wait indefinitely for the gauge value to change again.

Figure 3:
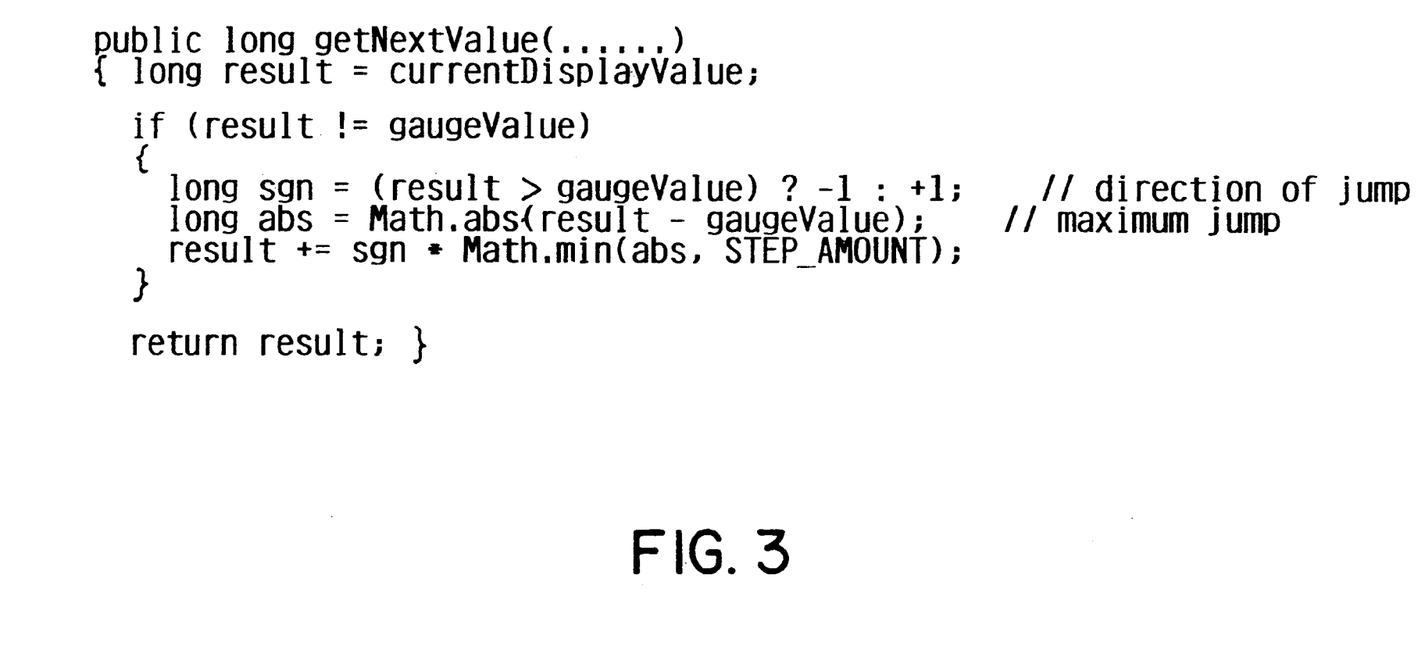

In order to create a "linear" behaviour, as described in 4.3, the "getNextValue" method can be amended, as shown in FIG. 3, where "STEP_AMOUNT" represents the absolute amount by which the presentation value will jump toward the gauge value each time around. The value of STEP_AMOUNT is a variable whose value can be specified by the behaviour customisation to adjust the resolution of the linear behaviour.

Inertial Behaviour Interface

To create an "inertial" behaviour, as described in 4.4, is a little more complex. The method described here gives an aesthetically pleasing effect which models damped simple harmonic oscillation well.

Figure 4A:
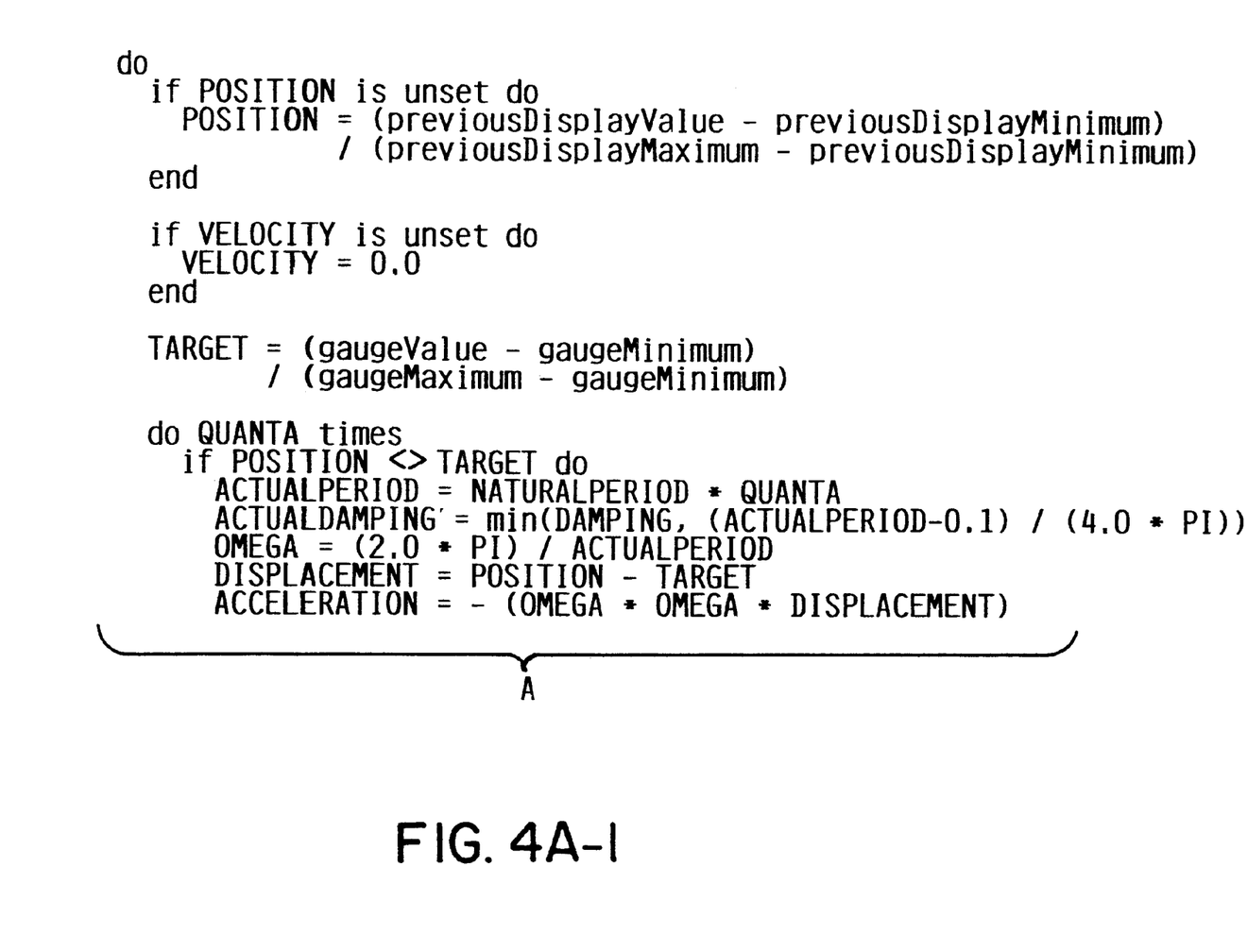
Figure 4A:
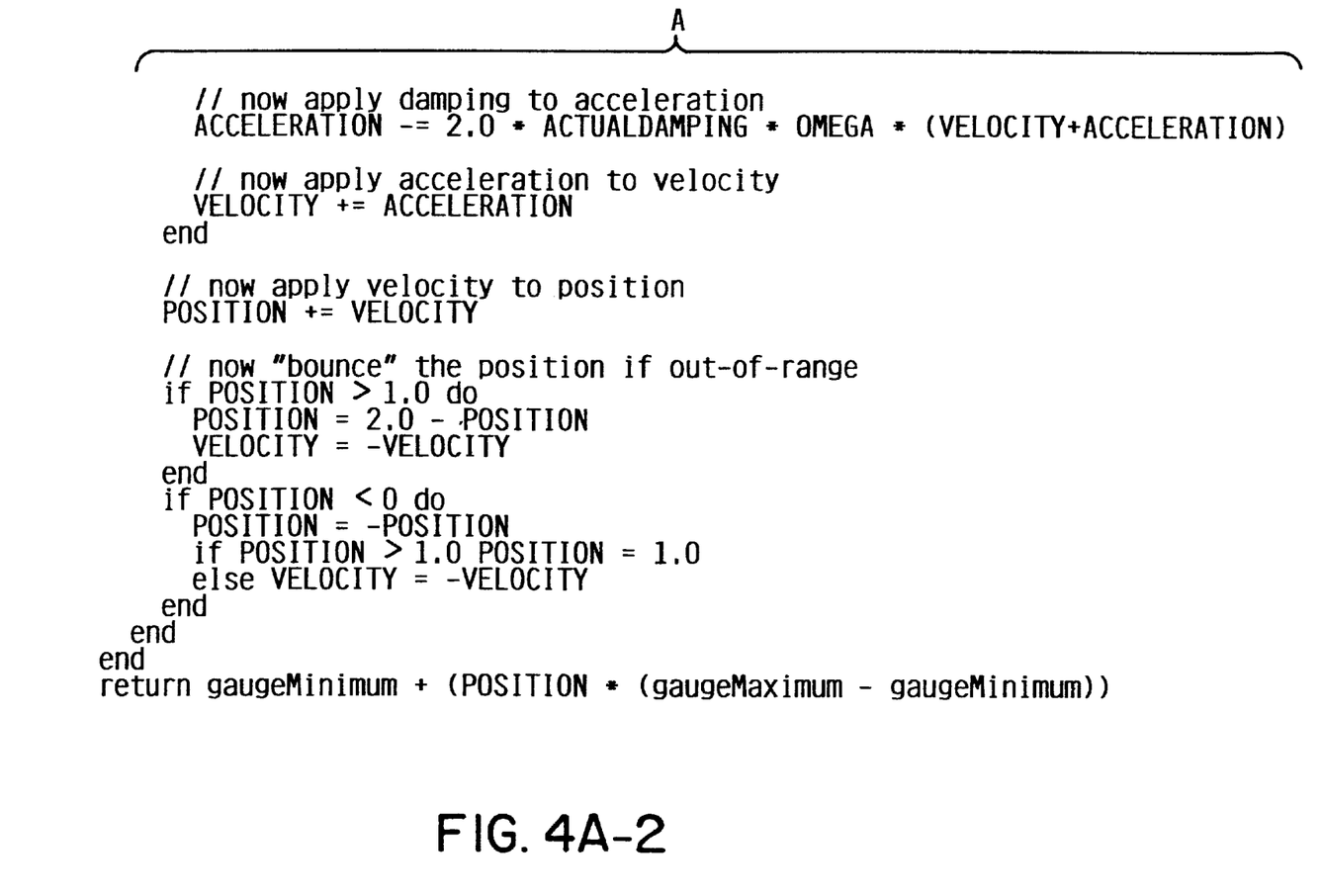

In the method to implement the "getNextValue" method shown in FIG. 4(a), the following values are used:

"QUANTA"—the number of time quanta which each call to "getNextValue" is to represent. Larger values of "QUANTA" give more realistic effects, but increase the computation required. Empirical tests have shown values of about 12 or above to be satisfactory.

"NATURALPERIOD"—the number of calls to "getNextValue" which it would take for one complete oscillation with zero damping.

"DAMPING"—the damping factor: when "DAMPING" is 1.0, the system is critically damped, and settles quickly to the target value. When "DAMPING" is less than 1.0 but greater than 0, the system is underdamped and will oscillate around the target value with decaying amplitude. The nearer 0 the value of "DAMPING" is, the longer the oscillations last. When "DAMPING" is greater than 1.0, the display of the presentation value appears overdamped, and will settle increasingly sluggishly toward the target value the larger the value of "DAMPING" is.

"POSITION"—this is the relative position of the value within the range, as a value from 0 to 1.0. This value is stored between calls to "getNextValue".

"VELOCITY"—this is the current nominal velocity of the value in ranges (0 to 1.0, as for "POSITION") per time quantum.

"ACCELERATION"—this is the nominal acceleration of the value in ranges per time quantum per time quantum. This value is calculated each time around.

Other intermediate values are also computed as required.

Figure 4B:
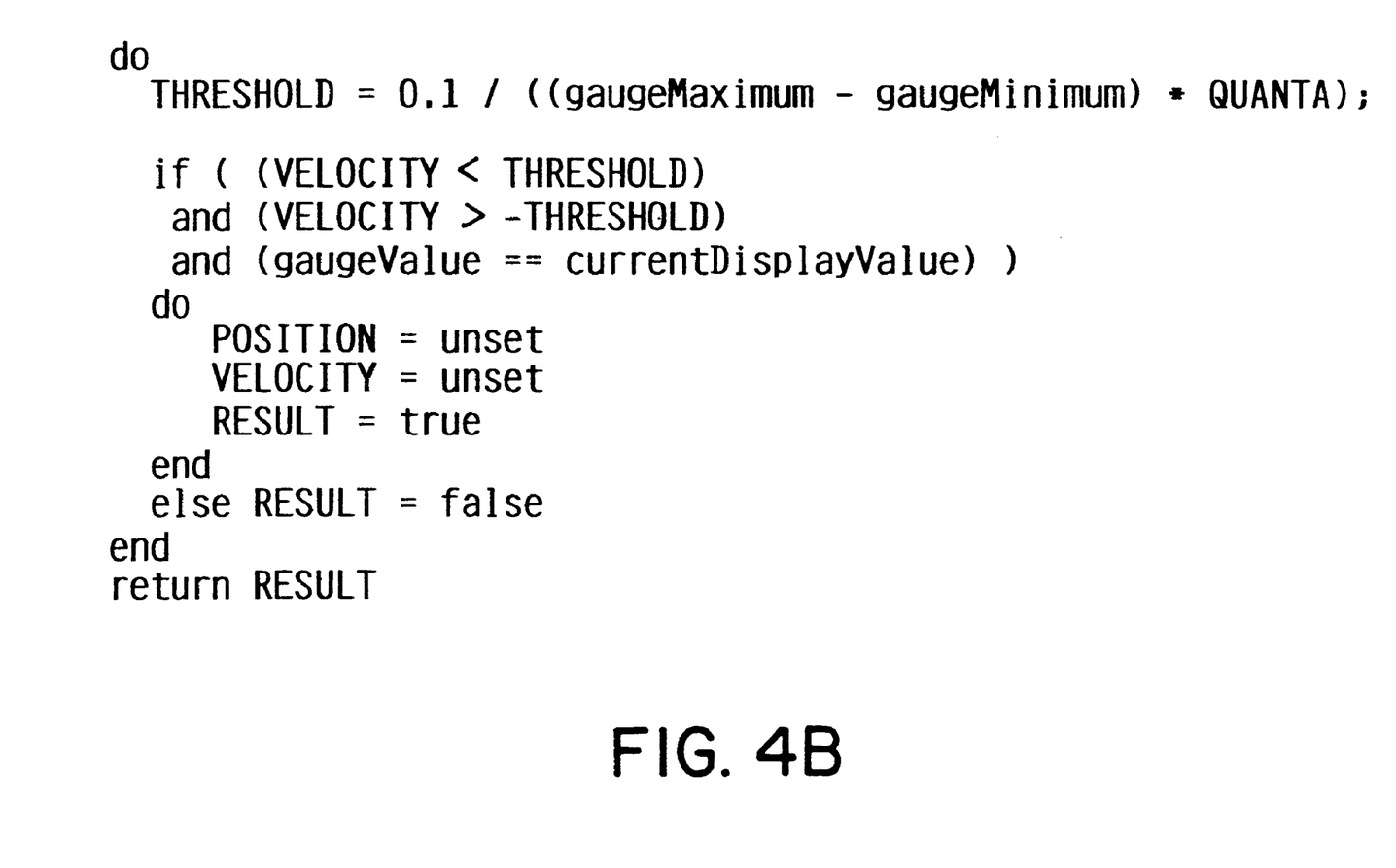

In order to determine whether the gauge is synchronised, it is simply a matter of checking that the presentation value matches the current gauge value (and range, of course) and also that the velocity is zero (ie, the gauge has truly settled on the target value). In practice, floating point rounding effects on computer systems can cause this latter test to be unreliable, so a small threshold is used, based upon the range of values returned. In this way, the gauge reports that it is synchronized when the velocity becomes so small that it is unlikely that is will ever again cause the actual integer presentation value to change. The computation is shown in FIG. 4(b).

Inertial behaviour is one for which the "resetSynchronization" method is important, as otherwise a new GaugeSynchronization could be assigned to a gauge, and bring with it a previous position and velocity. The implementation of the method simply unsets "POSITION" and "VELOCITY".

What is claimed is:

1. A user interface component for presenting a changing value according to a pre-determined behavioural and presentational characteristic, said component comprising:
   a kernel that displays a presentation value;
   a control interface through which an external system communicates the changing value to the kernel, wherein said presentation value is derived from said changing value;
   a presentation interface through which the presentation characteristic of the user interface component is determined; and
   a behaviour interface through which an external system communicates with said kernel to determine the behavioural characteristic of the user interface component, wherein said behaviour interface receives said changing value and said presentation value, wherein said interface communicates a next presentation value to a behaviour customisation, and wherein said behaviour interface determines said next presentation value according to an inertial behavioural model.

2. The user interface component of claim 1, wherein said behaviour interface enables said behaviour customisation to indicate to the kernel if the presentation value is synchronised with said changing value.

3. The user interface component of claim 1, wherein said behaviour interface enables said behaviour customisation to control when the kernel will next communicate with said customisation to determine said next presentation value.

4. The user interface component of claim 1, wherein the behaviour interface indicates said presentation value is synchronised with said changing value when said presentation value is equal to said changing value.

5. The user interface component of claim 1, wherein the behaviour interface indicates said presentation value is synchronised with said changing value when said presentation value is substantially equal to said changing value and the rate of change of said presentation value is substantially zero.

6. A method of presenting a changing value in a user interface component, wherein a behaviour interface communicates with a behaviour customisation to determine the behavioural characteristic of the user interface component, comprising the steps of:
   consulting the behaviour customisation to determine a next presentation value;
   submitting the next presentation value for presentation to a user;
   consulting the behaviour customisation to determine whether or not the presentation value is synchronised;
   if the presentation value is synchronised, issuing any required notifications of this, via a control interface;
   consulting the behaviour customisation to determine, according to whether or not the user interface component is synchronised, a time delay after which the behaviour customisation is to be consulted;
   in response to a change in said value before said specified time delay elapses, said steps are executed again; and
   when no change in said value occurs, waiting until said specified time delay elapses to commence said steps again.

* * * * *

UNITED STATES PATENT AND TRADEMARK OFFICE
CERTIFICATE OF CORRECTION

PATENT NO. : 6,094,195
DATED : July 25, 2000
INVENTOR(S) : David John Clark, Adam Alexander Dobson and Andrew John Smith

Page 1 of 1

It is certified that error appears in the above-identified patent and that said Letters Patent is hereby corrected as shown below:

Title page,
Item [74], *Attorney, Agent, or Firm,* "Owens J. Gamon" should be -- Owen J. Gamon --.

Signed and Sealed this

Nineteenth Day of October, 2004

JON W. DUDAS
*Director of the United States Patent and Trademark Office*